United States Patent
Dreibholz et al.

(10) Patent No.: US 6,366,843 B1
(45) Date of Patent: Apr. 2, 2002

(54) METHOD FOR CONTROLLING AN AUTOMATIC TRANSMISSION

(75) Inventors: Ralf Dreibholz, Meckenbeuren; Martin Vohmann, Esslingen; Gerd Frotscher, Friedrichshafen, all of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/856,730

(22) PCT Filed: Dec. 1, 1999

(86) PCT No.: PCT/EP99/09322

§ 371 Date: May 24, 2001

§ 102(e) Date: May 24, 2001

(87) PCT Pub. No.: WO00/34691

PCT Pub. Date: Jun. 15, 2000

(30) Foreign Application Priority Data

Dec. 7, 1998 (DE) .......................... 198 56 320

(51) Int. Cl.$^7$ .............................. F16H 61/04
(52) U.S. Cl. .................. 701/51; 701/55; 701/67
(58) Field of Search ................. 701/51, 54, 55, 701/56, 58, 67; 192/3.51, 3.52, 3.55, 3.57, 3.61

(56) References Cited

U.S. PATENT DOCUMENTS

| | | | |
|---|---|---|---|
| 2,465,983 A | 3/1949 | Winther | 171/252 |
| 3,034,744 A | 5/1962 | Bancroft | 242/155 |
| 5,079,970 A | 1/1992 | Butts et al. | 74/858 |
| 5,383,824 A | 1/1995 | Runge et al. | 477/110 |
| 5,562,567 A | 10/1996 | Koenig et al. | 477/54 |
| 5,795,265 A | 8/1998 | Domian et al. | 477/143 |

FOREIGN PATENT DOCUMENTS

| | | |
|---|---|---|
| DE | 1 105 509 | 4/1961 |
| DE | 1 788 064 | 10/1972 |
| DE | 82 35 610.6 | 5/1983 |
| DE | 36 31 672 A1 | 4/1987 |
| DE | 42 09 091 A1 | 9/1993 |
| DE | 44 24 456 A1 | 1/1996 |
| DE | 694 02 014 T2 | 8/1997 |
| DE | 196 11 839 A1 | 10/1997 |
| DE | 196 19 409 A1 | 11/1997 |
| DE | 197 05 290 A1 | 9/1998 |
| EP | 0 312 601 A1 | 4/1989 |
| WO | 91/13780 | 9/1991 |
| WO | 97/35739 | 10/1997 |

OTHER PUBLICATIONS

Schwab, Manfred and Alfred Müller, "Der Motoreingriff—ein neues Element der elektronischen Getriebesteuerung", *Bosch Technische Berichte 7*, 1983, pp. 166–174.

Japanese Abstract, No. 04121484 dated Dec. 10, 1993 to Sawafuji Electric Co., Ltd.

*Primary Examiner*—Richard M. Camby
(74) *Attorney, Agent, or Firm*—Davis & Bujold, P.L.L.C.

(57) ABSTRACT

A method for controlling an automatic transmission driven by an internal combustion engine is proposed in which a shift from a first to a second transmission ratio occurs as a pull upshift by a first clutch opening and a second clutch closing and electronic transmission control unit controls via electromagnetic valves the pressure curve of the first and of the second clutch during the shifting operation. The shifting operation is divided into different shifting phases, an engine intervention taking place within the gradient-adjustment (GE), the sliding (GL), the gradient-reduction (GA) and the closing (S) phases, an engine torque being reduced by an engine intervention factor (mdzegs) being transferred from the transmission control device to an engine control device of the internal combustion engine.

13 Claims, 1 Drawing Sheet

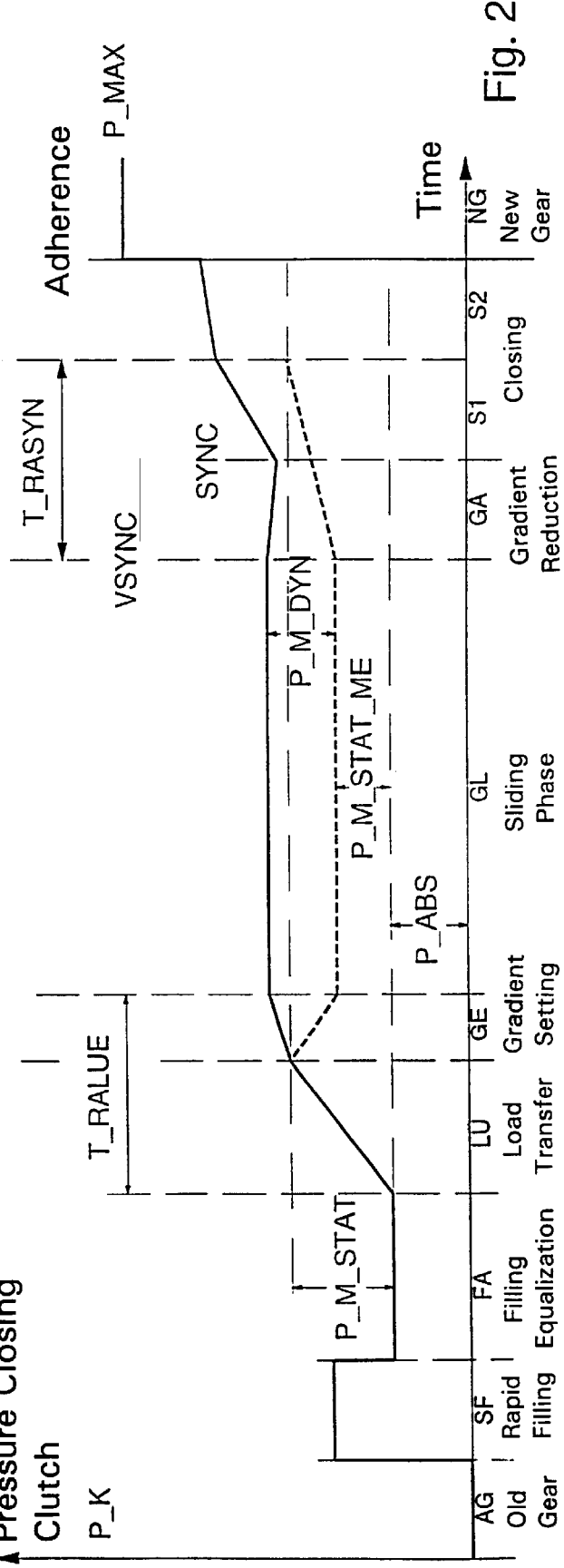

METHOD FOR CONTROLLING AN AUTOMATIC TRANSMISSION

The invention relates to a method for controlling an automatic transmission driven by an internal combustion engine in which a shift from a first to a second transmission ratio occurs in the form of a pull upshift. Here a first clutch opens and a second one closes and an electronic transmission control device controls, via electromagnetic valves, the pressure curve of the first and of the second clutch during the shifting operation. The latter consists of a rapid-filling, a filling-equalization, a load transfer, a gradient-setting, a sliding, a gradient-reduction and a closing phase.

Such a method is known already from the Applicant's laid open application DE 44 24 456 A1 which is included by explicit reference in the contents of the preamble of the instant patent application. In this publication is particularly proposed to use this method in a group transmission.

From the prior art ("The Engine Intervention"—a new element of the electronic transmission control by Manfred Schwab and Alfred Müller, Bosch, Technical Reports 7, 1983, pp. 166 to 174) is known, in general, to effect an engine intervention during a shifting operation, it being possible by an exactly time controlled curve of the engine torque during shifting operation of an automatic transmission to optimize the control of the transmission with regard to shifting comfort, service life of the friction elements and to the transmissible power of the transmission. By engine intervention is to be understood all steps which, during a shifting operation in the transmission, allow purposefully to modulate, especially to reduce, the engine torque generated by the combustion process. Due to the legislator's strict requirement on the reaction time and the time cycle of the control during a total duration of the intervention of only about 500 ms, a precisely timed coordination of the shifting operation is required. An engine intervention can be used both in upshifts and downshifts. The primary object of the engine intervention in upshifts is to reduce the energy loss produced in the friction elements during the shifting operation by reducing the engine torque during the synchronization process without interrupting the traction. The tolerance obtained thereby can be used to increase the service life of the friction partners by abbreviating the grinding time.

From DE 42 09 091 A1 is further known already a method for reducing the engine torque during a gear shift in a motor vehicle. The energy torque which results from rotating masses to be retarded or accelerated during a change of speed of the rotation angle of the engine determined by a gear change is calculated and the engine torque is reduced during coupling of the new transmission gear by the amount of the energy torque.

Methods of the above mentioned kind are subject to constant further developments with regard to an optimal use of the engine intervention with the smallest possible load of the shifting elements, the same as an optimal torque curve that takes into account the directives of the engine manufacturer, especially in relation to the limits of the maximum possible engine intervention with regard to mixture and exhaust conditions.

The problem to be solved by this invention is to indicate an optimized use of the engine intervention especially requiring a minimal adaptation expense, that is, in an analytic calculation process, for ex., the fewest possible parameters are needed.

According to the invention, this problem is solved in a method of the kind above indicated with an engine intervention by a reduction of the engine torque occurring within the gradient-setting, sliding, gradient-reduction and closing phases, an engine intervention factor being transmitted from the transmission control device to an engine control device of the internal combustion engine. Thereby is advantageously obtained that the pressure curve set of the second, closing clutch and the friction torque resulting therefrom, the same as the torque generated by the intervention factor and emitted by the engine, is optimally matched in time without need of expensive adaptation parameters and expense.

In one development of the invention, it is proposed that a maximum engine intervention factor mdzegsomax be calculated from a maximum dynamic torque M_DYN, a static torque without engine intervention M_STAT and a maximum adjustable engine characteristic factor KF_MDZ MAX.

The maximum engine intervention factor mdzegsomax is calculated as the ratio of the dynamic engine torque M_DYN to the static engine torque M_STAT.

This applies to the case that the value thus calculated be smaller than the maximum adjustable engine characteristic factor KF_MDZ MAX. But in case the value, thus calculated, is greater than the maximum adjustable engine characteristic factor KF_MDZ MAX, then the maximum engine intervention factor mdzegsomax corresponds to the maximum adjustable engine characteristic factor KF_MDZ MAX.

In a special development of the invention is proposed that the engine intervention factor mdzegs in the gradient-setting phase GE be linearly increased all along beginning from a value zero to the value of the maximum engine intervention factor mdzegsomax. In the sliding phase GL that follows, the engine intervention factor mdzegs is maintained essentially constant at the value mdzegsomax and in the gradient-reduction phase GA and closing phase S that follow the engine intervention factor mdzegs is reduced from the maximum engine intervention factor mdzegsomax to the value zero.

The pressure on the second clutch P_K to close is advantageously calculated from the static engine torque with engine intervention M_STAT ME, the dynamic engine torque M_DYN, a factor F1 and a converter reinforcement WV, the same as the absolute pressure P_ABS.

The static engine torque with engine intervention M_STAT ME is calculated as the product from the static engine torque M_STAT by the sum of one minus the engine intervention factor mdzegs.

The clutch pressure P_K at the start of the engine intervention, namely, at the start of the GE phase, is calculated as the sum of the absolute pressure P_ABS and the static engine pressure P_M STAT which is calculated as product from the factor F1 by the static engine pressure M_STAT by the converter reinforcement WV, the absolute pressure P_ABS being the pressure required to overcome the recoil spring tensions and the friction on the actuating piston.

The clutch pressure P_K during the sliding phase GL is calculated as the sum of the absolute pressure P_ABS and the pressure P_M STAT ME of the static engine torque with engine intervention and the pressure P_M DYN of the dynamic engine torque, the pressure P_M DYN being calculated as the product from the factor F1 by the converter reinforcement WV by the dynamic engine torque M_DYN.

According to the invention the pressure of the second closing clutch during the pull upshift takes the following course: In the rapid-filling phase SF, the clutch is loaded with high pressure, in the filling-equalization phase FA; it is filled to a lower pressure level P_ABS and, in the load-transfer phase LÜ, the pressure is increased to an end value P_ABS+P_M STAT. In the gradient-setting phase GE, the pressure is increased from the value P_ABS+P_M STAT to a new end value P_ABS+P_M STAT ME +P_M DYN and in the sliding phase GL be kept constant until reaching a pre-synchronizer point VSYNC. Then follows the gradient-reduction phase GA in which the pressure is reduced to an end value P_ABS+P_M STAT and upon reaching the end value the closing phases S1 and S2 begin.

It is proposed in a development of the invention that the beginning of the engine intervention for synchronization with the shifting pressure build-up in the phases GE and GL be delayed, via a time step, when the reaction for the engine intervention is quicker than the reaction to the pressure directives. Thereby is advantageously obtained that the output torque be not unnecessarily reduced.

In reversal of the above mentioned features, it is proposed that the beginning of the shifting pressure build-up for synchronization with the engine intervention in the phases GE and GL be delayed, via a time step, when the reaction of the engine intervention is slower than the reaction to the pressure directives. Thereby unnecessary friction stresses on the shifting elements can be advantageously prevented.

In a development of the invention, the dynamic engine torque M_DYN is increased during the gradient-setting phase GE from 0 to 100%, in the sliding phase GL it remains at 100% and, in the gradient-reduction phase GA that follows, the dynamic engine torque M_DYN is again reduced from 100% to 0.

The engine intervention for the rest is activated only when the engine rotational speed exceeds a preset value whereby a stalling of the engine is advantageously prevented.

The maximum possible engine intervention factor mdzegsomax is advantageously stored in a characteristic field according to operating parameters such as of the engine rotational speed, of the load position, or of the injection amount, or of the engine torque, or of the air mass.

The maximum adjustable engine characteristic factor KF_MDZ MAX is reported back from the engine control device to the transmission control device whereby a quick regulation of the engine intervention factor is made possible.

Other objects, features, advantages and possible utilizations of the invention result from the description that follows of the embodiment shown in the figures. All the features described and/or graphically shown constitute the object of the invention by themselves or in any logical combination independently of their compilation in the claims and their references to other claims. In the drawing:

FIG. 1 is the curve of the engine intervention factor mdzegs in the course of time; and FIG. 2 is the curve of the pressure P_K of the second closing clutch in the course of time.

The engine intervention factor mdzegs (FIG. 1) starts at the beginning of the gradient-setting phase GE from a value zero along the line mdzegso linearly to the maximum engine intervention factor mdzegsomax. The latter is reached with the end of the gradient-setting phase GE. The value then remains constant during the sliding phase GL and at the start of the gradient-reduction phase GA until the end of the closing phase S1 is linearly reduced down to the zero value.

The curve of the engine intervention factor mdzegs is delayed in time and occurs with an increase changed in relation to the unfiltered curve mdzegso along the line mdzegs when the reaction of the engine intervention is quicker than the reaction to the pressure directives.

The curve of the pressure P_K for the second clutch to close (FIG. 2) begins at the pressure value zero for the time interval in which the old gear AG still is coupled. This is followed by a rapid-filling phase SF in which the clutch to close is loaded with high pressure. In the filling-equalization phase FA that follows occurs a filling of the clutch with a pressure of lower level P_ABS, which corresponds to the pressure required to overcome recoil spring tensions and the friction on the actuating piston. Thereafter the pressure P_K is linearly increased to a value P_ABS+P_M STAT.

In the gradient-setting phase GE that follows, the curve of the pressure rises to a pressure level corresponding to a value P_ABS+P_M STAT ME +P_M DYN. The value is maintained constant until the end of the sliding phase GL, the moment corresponding to the pre-synchronizer point VSYNC, and then, in the gradient-reduction phase GA, it is reduced almost to the pressure P_ABS+P_M STAT already existing at the beginning of the gradient-setting phase GE. In reality the synchronizer point SYNC appears before the ideal synchronizer point after the time T_RASYN. In the closing phase S1 then occurs one other linear increase of the pressure P_K and simultaneously the termination of the ignition intervention. Until adhering of the friction linings of the second clutch to close, at the end of the closing phase S2 there follows one other pressure increase of the second clutch. Starting from this moment, the maximum clutch pressure P_MAX is reached and a new gear NG is switched in.

The two phases load transfer LÜ and gradient setting GE are also jointly designated as the phase of the ramp of the load-transfer T_RALUE. During the gradient-reduction phase GA, the curve of the pressure P_K corresponds to the ramp from the change of the dynamic torque. The closing phase S1 corresponds to a closing ramp plus a ramp from the change of the engine torque while the pressure curve in the subsequent phase S2 follows the closing ramp exclusively.

What is claimed is:

1. A method for controlling an automatic transmission driven by an internal combustion engine in which a shift from a first to a second transmission ratio occurs in the form of a pull upshift by a first clutch opening and a second clutch closing wherein an electronic transmission control device controls, via electromagnetic valves, the pressure curve of the first and of the second clutch during the shifting operation and the shift consists of a rapid-filling (SF), a filling-equalization (FA), a load-transfer (LÜ), a gradient setting (GE), a sliding (SL), a gradient-reduction (GA) and a closing (S) phase, wherein the gradient-setting (GE), the sliding (GL), the gradient-reduction (GA) and the closing (S) phases the engine intervention is effected by a reduction of the engine torque (M_MOT), an the engine intervention factor (mdzegs) being transmitted from a transmission control device to an engine control device of the internal combustion engine, and wherein a clutch pressure (P_K) on the closing clutch is calculated from a static engine torque with engine intervention (M_STAT ME), a dynamic engine torque (M_DYN), a factor (F1), a converter reinforcement (WV) and an absolute pressure (P_ABS), the static engine torque with engine intervention (M_STAT ME) being calculated as the product from the static engine torque (M_STAT) by the sum of one minus the engine intervention factor (mdzegs).

2. The method according to claim 1, wherein the engine intervention factor (mdzegs) in the phase (GE) is linearly increased in the course of time from zero to the value of the maximum engine intervention factor (mdzegsomax), in the phase (GL) it is maintained substantially constant and in the phase (GA)+(S) it is reduced from the maximum engine intervention factor (mdzegsomax) to zero.

3. The method according to claim 2, wherein a maximum engine intervention factor (mdzegsomax) is calculated from a maximum dynamic torque (M_DYN), a static engine torque without engine intervention (M_STAT) and a maximum adjustable engine characteristic factor (KF_MDZ MAX).

4. The method according to claim 2, wherein the maximum engine intervention factor (mdzegsomax) is calculated as the ratio of the dynamic engine torque (M_DYN) to the static engine torque (M_STAT) in the case that said value be smaller than the maximum adjustable engine characteristic factor (KF_MDZ MAX), and in case said calculated value be greater than the maximum adjustable engine characteristic factor (KF_MDZ MAX), the maximum engine intervention factor (mdzegsomax) corresponds to the maximum adjustable engine characteristic factor (KF_MDZ MAX).

5. The method according to claim 1, wherein the clutch pressure (P_K) at the beginning of the engine intervention, namely, at the beginning of the phase (GE), is calculated as the sum of the absolute pressure (P_ABS) and the static engine pressure (P_M STAT), the latter being calculated as product of the factor (F1) by the static engine torque (M_STAT) by the converter reinforcement (WV).

6. The method according to claim 1, wherein the clutch pressure (P_K) during the sliding phase (GL) is calculated as the sum of the absolute pressure (P_ABS) and the pressure (P_M STAT ME) of the static engine torque with engine intervention and the pressure (P_M DYN) of the dynamic engine torque, (P_M DYN) is calculated as the product of the factor (F1) by the converter reinforcement (WV) and the dynamic engine torque (M_DYN).

7. The method according to claim 1, wherein the second clutch in the pull upshift during the rapid-filling phase (SF) is loaded with high pressure, in the filling-equalization phase (FA) it is filled to a lower pressure level (P_ABS) and in the load-transfer phase (LÜ) the pressure of the second clutch is increased to an end value (P_ABS+P_M STAT) and in the gradient-setting phase (GE) the pressure is increased from the end value (P_ABS+P_M STAT) to an end value (P_ABS+P_M STAT ME+P_M DYN), in the sliding phase (GL) the pressure remains constant until a pre-synchronous point (VSYNC) is detected, in the gradient-reduction phase (GA) the pressure of the second clutch is reduced to an end value (P_ABS+P_M STAT) and upon reaching the end value the closing phase (S1, S2) begins.

8. The method according to claim 1, wherein the start of the engine intervention for synchronization with the shifting pressure build-up in the phases (GE) and (GL) is delayed during a period when the reaction of the engine intervention is quicker than the reaction to the pressure directives.

9. The method according to claim, 1, wherein the beginning of the shifting pressure build-up for synchronization with the engine intervention in the phases (GE) and (GL) is delayed during a period when the reaction of the engine intervention is slower than the reaction to the pressure directives.

10. The method according to claim 1, wherein the dynamic engine torque (M_DYN) during the gradient-setting phase (GE) is increased from zero to 100%, in the sliding phase (GL) it remains at 100% and in the gradient-reduction phase (GA) it is reduced from 100% to zero.

11. The method according to claim 1, wherein the engine intervention is activated when the engine rotational speed exceeds a preset value.

12. The method according to claim 1, wherein the maximum possible engine intervention factor (mdzegsomax) is stored in a characteristic field according to operating parameters such as engine rotational speed, load position, or injection amount, or engine torque, or air mass.

13. The method according to claim 1, wherein the maximum adjustable engine characteristic factor (KF_MDZ MAX) is actually reported back from the engine control device to the transmission control device.

\* \* \* \* \*